United States Patent
Lin

(10) Patent No.: US 9,632,323 B2
(45) Date of Patent: Apr. 25, 2017

(54) LASER PEN, PORTABLE ELECTRONIC DEVICE AND LASER INDICATING SYSTEM

(71) Applicant: Chiun Mai Communication Systems, Inc., New Taipei (TW)

(72) Inventor: Po-Chou Lin, New Taipei (TW)

(73) Assignee: Chiun Mai Communication Systems, Inc., New Taipei (TW)

( * ) Notice: Subject to any disclaimer, the term of this patent is extended or adjusted under 35 U.S.C. 154(b) by 506 days.

(21) Appl. No.: 14/144,525

(22) Filed: Dec. 30, 2013

(65) Prior Publication Data
US 2014/0312712 A1    Oct. 23, 2014

(30) Foreign Application Priority Data

Apr. 23, 2013    (TW) .............................. 102114283 A

(51) Int. Cl.
*H01H 35/00*    (2006.01)
*G02B 27/20*    (2006.01)

(52) U.S. Cl.
CPC ........... *G02B 27/20* (2013.01); *Y10T 307/766* (2015.04)

(58) Field of Classification Search
CPC .............................. Y10T 307/766; G02B 27/20
See application file for complete search history.

(56) References Cited

U.S. PATENT DOCUMENTS

| | | | | |
|---|---|---|---|---|
| 6,341,871 B1* | 1/2002 | Angelopoulos | ......... | H04M 1/21 362/109 |
| 8,611,564 B1* | 12/2013 | Yen | .................... | H01R 13/7175 381/124 |
| 8,801,472 B1* | 8/2014 | Yen | ...................... | H01R 13/703 439/668 |
| 2006/0014564 A1* | 1/2006 | Kung | ...................... | H04M 1/22 455/557 |
| 2011/0098085 A1 | 4/2011 | Stenmark et al. | | |
| 2012/0200172 A1* | 8/2012 | Johnson | ............... | H04R 29/001 307/116 |
| 2013/0094802 A1* | 4/2013 | Azadeh | ................... | H01S 5/042 385/15 |

FOREIGN PATENT DOCUMENTS

JP    2010-278691 A    12/2010
TW    M450856 U1    4/2013

* cited by examiner

*Primary Examiner* — Jared Fureman
*Assistant Examiner* — Duc M Pham
(74) *Attorney, Agent, or Firm* — Steven Reiss

(57) ABSTRACT

A laser pen includes a laser diode and a plug. The plug is received in an earphone jack of a portable electronic device. The laser pen obtains power from the portable electronic device to turn on the laser diode.

15 Claims, 2 Drawing Sheets

LASER PEN, PORTABLE ELECTRONIC DEVICE AND LASER INDICATING SYSTEM

BACKGROUND

1. Technical Field

The disclosure generally relates to laser pens, and particularly to an environmental laser pen, a portable electronic device mating with the laser pen, and a laser indicating system with the laser pen.

2. Description of the Related Art

Laser pens are widespread used in offices, classrooms, or meeting rooms. A typical laser pen is powered by an inner battery. However, the battery will occupy space of the laser pen, and which is unfavorable to miniaturization of the laser pen. Furthermore, once a capacity of the battery is exhausted, the battery must be replaced with a new battery, which leads to a waste.

Therefore, there is room for improvement within the art.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, like reference numerals designate corresponding parts throughout the several views. Wherever possible, the same reference numbers are used throughout the drawings to refer to the same or like elements of an embodiment.

DETAILED DESCRIPTION

Figure 1:
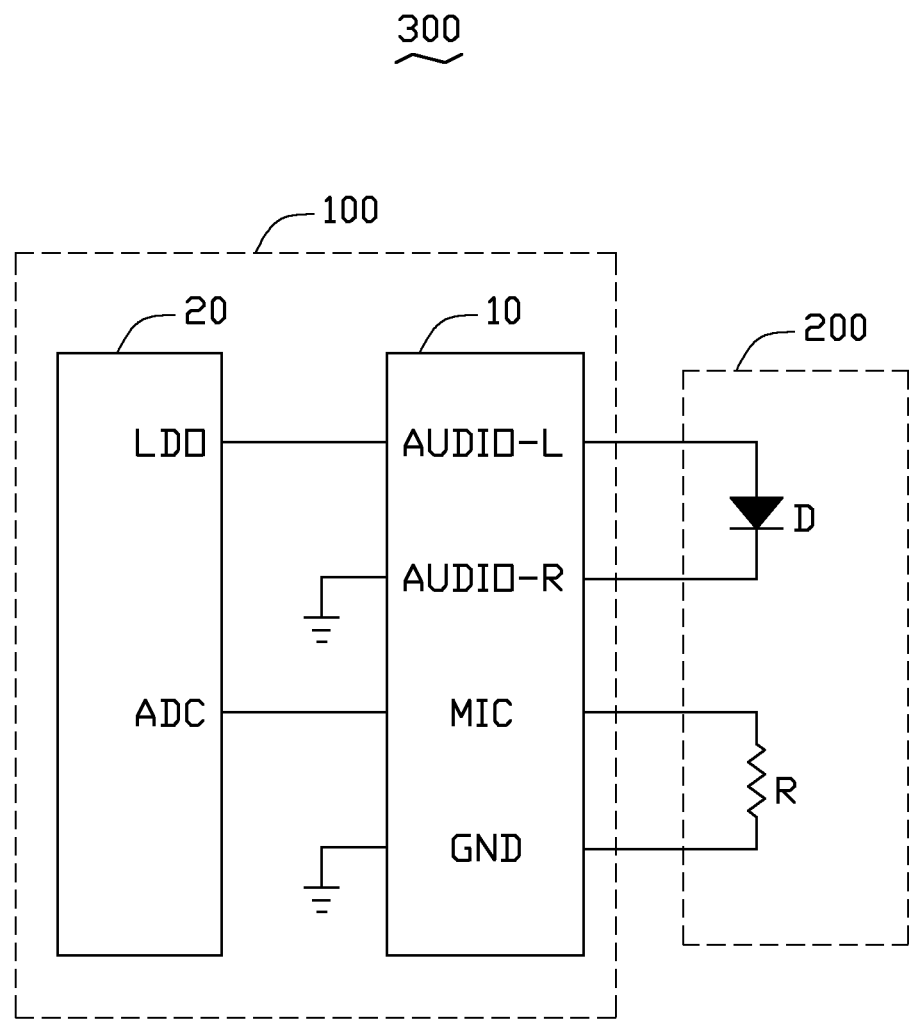
FIG. 1 is a circuit diagram of a laser indicating system, according to an exemplary embodiment.

FIG. 1 shows a laser indicating system 300, according to an exemplary embodiment. The laser indicating system 300 includes a portable electronic device 100 and a laser pen 200. The laser pen 200 can be electronically connected to the portable electronic device 100 and obtains power from the portable electronic device 100.

The portable electronic device 100 includes an earphone jack 10 and a power management microchip 20 electronically connected to the earphone jack 10.

The earphone jack 10 includes a first channel pin, a second channel pin, a microphone pin MIC, and a grounding pin GND. In this exemplary embodiment, the first channel pin is a left channel pin AUDIO_L. The second channel pin is a right channel pin AUDIO_R. The right channel pin AUDIO_R and the grounding pin GND are both grounded. The power management microchip 20 includes a detecting pin ADC and a controlling pin LDO. The detecting pin ADC is electronically connected to the microphone pin MIC. The controlling pin LDO is electronically connected to the left contact pin AUDIO_L.

Figure 2:
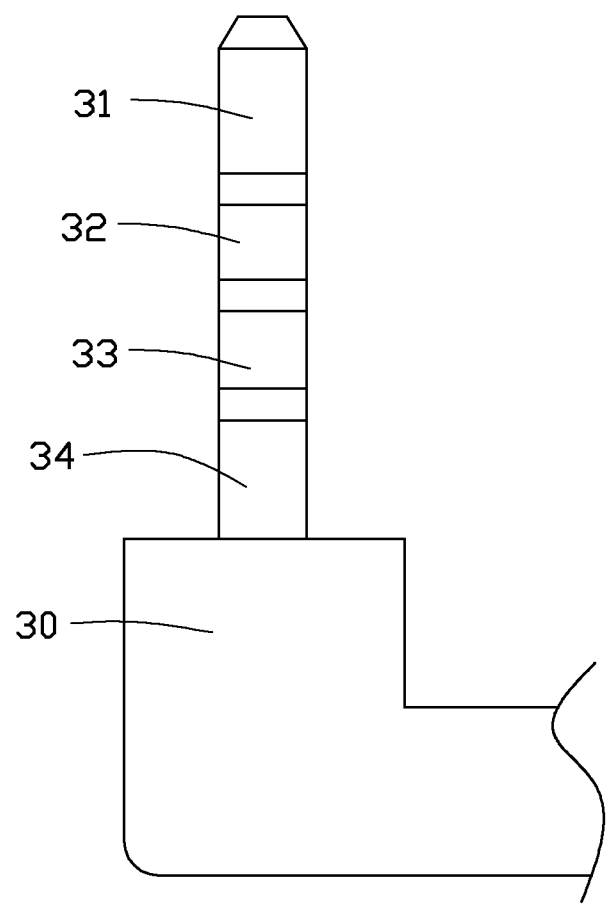
FIG. 2 is a schematic view of a plug of a laser pen shown in FIG. 1.

The laser pen 200 includes a laser diode D, a resistor R, and a plug 30. FIG. 2 shows the plug 30 including a first connecting contact 31, a second connecting contact 32, a third connecting contact 33, and a fourth connecting contact 34. The first connecting contact 31 is electronically connected to an anode of the laser diode D. The second connecting contact 32 is electronically connected to a cathode of the laser diode D. The third connecting contact 33 is electronically connected to an end of the resistor R. The fourth connecting contact 34 is electronically connected to another end of the resistor R.

The laser pen 200 can be electronically connected to the portable electronic device 100 through the plug 30 being received in the earphone jack 10. When the plug 30 of the laser pen 200 plugs into the earphone jack 10, the first connecting contact 31, the second connecting contact 32, the third connected contact 33, and the fourth connecting contact 34 are electronically connected to the left channel pin AUDIO_L, the right channel pin AUDIO_R, the microphone pin MIC, and the grounding pin GND, respectively. In this way, the anode of the laser diode D is electronically connected to the left channel pin AUDIO_L through the first connecting contact 31. The cathode of the laser diode D is electronically connected to the right channel pin AUDIO_R through the second connecting contact 32. An end of the resistor R is electronically connected to the microphone pin MIC through the third connecting contact 33. Another end of the resistor R is electronically connected to the grounding pin GND through the fourth connecting contact 34.

The earphone jack 10 of the portable electronic device 100 can also receive an earphone plug, e.g., a four pin earphone plug including a left channel point, a right channel point, a microphone point, and a ground point orderly formed thereon. When the typical four pin earphone plug is received in the earphone jack 10, the microphone point of the four pin earphone plug equals to a field effect transistor, and a voltage of the microphone point satisfies a bias voltage range, such as 0.3 volts (V) to 0.8V.

Therefore, a resistance of the resistor R can be selected to make a voltage of the resistor R out of the bias voltage range (e.g., 1V). In this way, the detecting pin ADC can detect a type of a periphery device connected to the portable electronic device 100 (e.g., the typical four pin earphone or the laser pen 200) according to a voltage of the microphone pin MIC. That is, if the voltage of the microphone pin MIC satisfies the bias voltage range, the detecting pin ADC determines that the four pin earphone plug is received in the earphone jack 10. If the voltage of microphone pin MIC does not satisfy the bias voltage range (e.g., 1V), the detecting pin ADC determines that the plug 30 of the laser pen 200 is received in the earphone jack 10. Furthermore, when the detecting pin ADC determines that the laser pen 200 is electronically connected to the portable electronic device 100, the controlling pin LDO provides power to the laser pen 200 through the left contact pin AUDIO_L.

In use, when a periphery device is electronically connected to the portable electronic device 100, the portable electronic device 100 detects a type of the periphery device through the detecting pin ADC. In detail, if the detecting pin ADC detects that a voltage of the microphone pin MIC satisfies the bias voltage range, the portable electronic device 100 determines that the typical four pin earphone plug is received in the earphone jack 10. In this way, the portable electronic device 100 performs a common function, that is, receiving signals from or sending signals to the plugged in earphone through the earphone jack 10.

Once the detecting pin ADC detects that the voltage of the microphone pin MIC does not satisfy the bias voltage range, the portable electronic device 100 determines that the plug 30 of the laser pen 200 is received in the earphone jack 10. In this way, the portable electronic device 100 performs an additional function, i.e., providing power to the laser pen 200 through the controlling pin LDC and the left contact pin AUDIO_L to turn on the laser diode D.

In other exemplary embodiments, the first channel pin can be a right channel pin AUDIO_R and the second channel pin is a left contact pin AUDIO_L.

In summary, due to the laser pen 200 including the plug 30, the laser pen 200 can be electronically connected to the portable electronic device 100 and obtains power from the portable electronic device 100. In this way, the laser pen 200 does not need to be equipped with a battery, which is advantageous for a miniaturization of the laser pen 200. Furthermore, the laser pen 200 also does not need battery replacement, which decreases a cost of the laser pen 200 and is environmental.

In the present specification and claims, the word "a" or "an" preceding an element does not exclude the presence of a plurality of such elements. Further, the word "comprising" does not exclude the presence of elements or steps other than those listed.

It is to be also understood that even though numerous characteristics and advantages of exemplary embodiments have been set forth in the foregoing description, together with details of the structures and functions of the embodiments, the disclosure is illustrative only, and changes may be made in detail, especially in matters of arrangement of parts within the principles of this disclosure to the full extent indicated by the broad general meaning of the terms in which the appended claims are expressed.

What is claimed is:

1. A portable electronic device, comprising:
an earphone jack; and
a power management microchip electronically connected to the earphone jack and comprising a detecting pin and a controlling pin; wherein the detecting pin is configured to detecting whether a plug of a laser pen is received in the earphone jack, when the detecting pin detects the plug of the laser pen received in the earphone jack, the controlling pin provides power to the laser pen through the earphone jack.

2. The portable electronic device of claim 1, wherein the earphone jack comprises a ground pin, a microphone pin, a first channel pin, and a second channel pin, the detecting pin is electronically connected to the microphone pin, the controlling pin is electronically connected to the first channel pin, the second channel pin and the ground pin are both grounded.

3. The portable electronic device of claim 2, wherein the power management microchip determines whether the plug of the laser pen is received in the earphone jack through a voltage of the microphone pin, when the power management microchip determines the plug of the laser pen is received in the earphone jack, the controlling pin outputs power to the laser pen through the first channel pin.

4. The portable electronic device of claim 2, wherein the first channel pin is a left channel pin and the second channel pin is a right channel pin.

5. The portable electronic device of claim 2, wherein the first channel pin is a right channel pin and the second channel pin is a left channel pin.

6. A laser indicating system, comprising:
a laser pen comprising a laser diode and a plug; and
a portable electronic device comprising an earphone jack and a power management microchip electronically connected to the earphone jack;
wherein the power management microchip comprises a detecting pin and a controlling pin, the detecting pin is configured to detect whether the plug of the laser pen is received in the earphone jack, when the detecting pin detects the plug of the laser pen is received in the earphone jack, the plug of the laser pen obtains power from the controlling pin to turn on the laser diode.

7. The laser indicating system of claim 6, wherein the earphone jack comprises a ground pin, a microphone pin, a first channel pin, and a second channel pin; the plug of the laser pen comprises a first connecting contact, a second connecting contact, a third connecting contact, and a fourth connecting contact; when the plug of the laser pen is received in the earphone jack, the first connecting contact, the second connecting contact, the third connecting contact, and the fourth connecting contact are connected to the first channel pin, the second channel pin, the microphone pin, and the grounding pin, respectively.

8. The laser indicating system of claim 7, wherein an anode of the laser diode is connected to the first connecting contact, a cathode of the laser diode is connected to the second connecting contact; the laser pen further comprises a resistor, an end of the resistor is electronically connected to the third connecting contact, and another end of the resistor is electronically connected to the fourth connecting contact.

9. The laser indicating system of claim 8, wherein the detecting pin is electronically connected to the microphone pin and detects whether the plug of the laser pen is received in the earphone jack according to a voltage of the microphone pin.

10. The laser indicating system of claim 9, wherein the controlling pin is connected to the first channel pin.

11. A portable electronic device, comprising:
an earphone jack; and
a power management microchip electronically connected to the earphone jack and comprising a detecting pin and a controlling pin; wherein the detecting pin is configured to detect whether a plug of a laser pen received in the earphone jack, when the detecting pin detects the plug of the laser pen received in the earphone jack, the controlling pin provides power to the laser pen through the earphone jack.

12. The portable electronic device of claim 11, wherein the earphone jack comprises a ground pin, a microphone pin, a first channel pin, and a second channel pin, the detecting pin is electronically connected to the microphone pin, the controlling pin is electronically connected to the first channel pin, the second channel pin and the ground pin are both grounded.

13. The portable electronic device of claim 12, wherein the power management microchip determines whether the plug of the laser pen is received in the earphone jack through a voltage of the microphone pin, when the power management microchip determines the plug of the laser pen is received in the earphone jack, the controlling pin outputs power to the laser pen through the first channel pin.

14. The portable electronic device of claim 12, wherein the first channel pin is a left channel pin and the second channel pin is a right channel pin.

15. The portable electronic device of claim 12, wherein the first channel pin is a right channel pin and the second channel pin is a left channel pin.

* * * * *